United States Patent
Tokunaga et al.

(10) Patent No.: US 10,927,749 B2
(45) Date of Patent: Feb. 23, 2021

(54) ENGINE CONTROL DEVICE

(71) Applicant: Mazda Motor Corporation, Hiroshima (JP)

(72) Inventors: Tatsuhiro Tokunaga, Aki-gun (JP); Masanari Sueoka, Hiroshima (JP); Keiji Maruyama, Hiroshima (JP); Tomohiro Nishida, Hiroshima (JP); Takuya Ohura, Hiroshima (JP); Toru Miyamoto, Higashihiroshima (JP); Junichi Taga, Higashihiroshima (JP); Hideki Omori, Hiroshima (JP); Kenji Tanimura, Hiroshima (JP); Hiroyuki Yabe, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/715,124

(22) Filed: Dec. 16, 2019

(65) Prior Publication Data

US 2020/0240319 A1 Jul. 30, 2020

(30) Foreign Application Priority Data

Jan. 28, 2019 (JP) .............................. JP2019-012511

(51) Int. Cl.
*F02B 1/12* (2006.01)
*F02D 37/02* (2006.01)
(Continued)

(52) U.S. Cl.
CPC ................ *F02B 1/12* (2013.01); *F02D 37/02* (2013.01); *F02B 2075/125* (2013.01);
(Continued)

(58) Field of Classification Search
CPC .. F02B 1/12; F02B 11/00; F02B 23/20; F02B 2075/125; F02B 2275/14; F02D 21/08;
(Continued)

(56) References Cited

U.S. PATENT DOCUMENTS 9,702,316 B2 * 7/2017 Iwai ........................ F02D 43/04
2020/0141377 A1 * 5/2020 Inoue ...................... F02B 23/02

FOREIGN PATENT DOCUMENTS

JP      H1068346 A     3/1998
JP      201887566 A     6/2018

* cited by examiner

*Primary Examiner* — John Kwon
*Assistant Examiner* — Johnny H Hoang
(74) *Attorney, Agent, or Firm* — Alleman Hall Creasman & Tuttle LLP

(57) ABSTRACT

A control device for an engine is provided, which includes a combustion controlling module, and an ignition retard determining module configured to determine whether there is a request for an ignition retard for retarding an ignition timing of an ignition plug. When the controlling module controls the ignition plug and an injector so that the SPCCI combustion is performed and there is not the ignition retard request, the controlling module executes a control in which the entire fuel to be injected in one cycle is injected in an intake stroke and a jump-spark ignition is carried out at a basic ignition timing, and when there is the ignition retard request, the controlling module executes a control in which an injection is performed in an intake stroke, a portion of the entire fuel is injected in a compression stroke, and the ignition timing is retarded from the basic ignition timing.

8 Claims, 11 Drawing Sheets

(51) Int. Cl.
    *F02B 75/12*        (2006.01)
    *F02D 41/30*        (2006.01)
    *F02D 41/40*        (2006.01)

(52) U.S. Cl.
    CPC ...... *F02B 2275/14* (2013.01); *F02D 41/3041* (2013.01); *F02D 41/401* (2013.01)

(58) Field of Classification Search
    CPC .... F02D 2021/083; F02D 37/02; F02D 41/30; F02D 41/3041; F02D 41/40; F02D 41/401
    See application file for complete search history.

ENGINE CONTROL DEVICE

TECHNICAL FIELD

The present disclosure relates to a device which controls an engine in which partial compression ignition combustion is possible.

BACKGROUND OF THE DISCLOSURE

As a combustion mode of a gasoline engine, partial compression ignition combustion (SPCCI combustion) is known in which a portion of a mixture gas is forcibly combusted by flame propagation triggered by jump-spark ignition (SI combustion), and the remaining mixture gas is combusted by self-ignition (CI combustion). For example, JP2018-87566A discloses an engine capable of performing SPCCI combustion, as a vehicle engine which is mounted on a vehicle, such as an automobile. In this engine, an amount of intake air is controlled and a severe ignition-timing control is carried out so that an air-fuel ratio (A/F) becomes a stoichiometric air-fuel ratio or larger than the stoichiometric air-fuel ratio ($\lambda \geq 1$) in order to secure ignitability and fuel efficiency during SPCCI combustion.

A driving force of an engine mounted on a vehicle, such as an automobile, is transmitted to wheels through a transmission, etc. In such an engine, when a gear shift to change a gear stage (gear ratio) of the transmission is performed, a control to temporarily change an output torque is performed for the purpose of reducing a gear-shift shock. Moreover, in recent years, in order to improve the maneuverability and stability of the vehicle during cornering, etc. (in order to secure the drivability of the vehicle), the grounding loads of four wheels are also optimized by changing the engine output torque (i.e., a driving torque of each wheel) according to a steering operation of a driver.

Meanwhile, in order to reduce the output torque of the engine, it is suitable to execute a control to retard the ignition timing in terms of a response. However, in this case, since a required retarding amount of the ignition timing increases as a target value (reduction target value) to which the output torque is reduced becomes lower, if the ignition timing is retarded in the engine disclosed in JP2018-87566A, especially to reduce the output torque during the control for performing SPCCI combustion, combustion stability degrades before the output torque reaches the reduction target value, and in the worst scenario, a misfire is induced.

SUMMARY OF THE DISCLOSURE

The present disclosure is made in view of the situations, and one purpose thereof is to provide a technology capable of further increasing a required retarding amount in the engine capable of performing so-called partial compression ignition combustion (SPCCI combustion), while maintaining combustion stability.

According to one aspect of the present disclosure, a control device for an engine including a combustion chamber, an ignition plug disposed in the combustion chamber, and an injector configured to inject fuel into the combustion chamber, is provided. The control device includes a processor configured to execute a combustion controlling module and an ignition retard determining module. The combustion controlling module controls the ignition plug and the injector so that partial compression ignition combustion in which spark ignition (SI) combustion of a portion of a mixture gas inside the combustion chamber is carried out by flame propagation from an ignited point of the ignition plug, and compression ignition (CI) combustion of the remaining mixture gas is carried out by self-ignition is performed. The ignition retard determining module determines whether there is a request for an ignition retard for retarding an ignition timing of the ignition plug. When controlling the ignition plug and the injector so that the partial compression ignition combustion is performed, when there is not the request for the ignition retard, the combustion controlling module executes a control in which the entire fuel to be injected in one cycle is injected in an intake stroke and jump-spark ignition is carried out at a basic ignition timing set according to an operating condition of the engine, and on the other hand, when there is the request for the ignition retard, the combustion controlling module executes a control in which the injection is performed in the intake stroke, a portion of the entire fuel is injected in a compression stroke, and the ignition timing is retarded from the basic ignition timing.

According to this configuration, when there is the request for the ignition retard, the injection is performed in the intake stroke (i.e., the intake-stroke injection), the portion of the entire fuel to be injected in one cycle is injected in the compression stroke (i.e., the compression-stroke injection), and the ignition timing is retarded from the basic ignition timing. When the portion of the entire fuel is injected in the compression stroke as described above, an air-fuel ratio (A/F) around the ignition plug at the retarded ignition timing becomes below a stoichiometric air-fuel ratio (in a rich state), and degradation of the ignitability and the combustibility at the retarded ignition timing is prevented. That is, a significant degradation in combustion stability is avoided. Therefore, it becomes possible to further increase an ignition retarding amount, while maintaining combustion stability.

The processor may be further configured to execute a combustibility estimating module to estimate combustion stability when the ignition timing is retarded. The combustion controlling module may execute the control in which the portion of the entire fuel is injected in the compression stroke, when there is the request for the ignition retard, and when combustion stability is estimated to be lowered below a given level when the ignition timing is retarded by a requested retarding amount.

According to this configuration, even when there is the request for the ignition retard, when combustion stability is estimated to be maintained when the ignition timing is retarded (when the degradation is estimated to be below a given level if combustion stability is degraded), the entire fuel to be injected in one cycle is injected in the intake stroke, similarly to the case in which there is not the request for the ignition retard. Therefore, generation of $NO_x$ is suppressed to a relatively low level. In the compression-stroke injection, since the ignition is performed in the rich state around the ignition plug, a temperature in the cylinder (in the combustion chamber) after the ignition easily becomes higher, and $NO_x$ easily occurs compared to the intake-stroke injection. In this regard, according to this configuration, since the occurrence of the compression-stroke injection is controlled to the necessary minimum, the generation of $NO_x$ is suppressed compared with the case in which only the compression-stroke injection is performed when there is the request for the ignition retard.

In the control device, the ignition retard determining module may determine that there is the request for the ignition retard based on the existence of a torque-down request for temporarily reducing an output torque of the engine.

According to this configuration, it becomes possible to increase the ignition retarding amount when there is the torque-down request, while maintaining combustion stability of the engine. In other words, a larger reduction of the output torque becomes possible while maintaining combustion stability of the engine.

In the control device, various modes can be considered in order to control the combustion controlling module so that the portion of the entire fuel is injected in the compression stroke while performing the injection in the intake stroke. For example, when there is not the request for the ignition retard, the combustion controlling module may cause the injector to inject the entire fuel to be injected in one cycle over a plurality of injections in the intake stroke, and when there is the request for the ignition retard, a timing of a final injection among the plurality of injections is changed from the intake stroke to the compression stroke.

According to this configuration, by the control of changing the timing of the final injection among the plurality of injections from the intake stroke into the compression stroke, the air-fuel ratio (A/F) around the ignition plug at the retarded ignition timing becomes below the stoichiometric air-fuel ratio (in a rich state), while maintaining the homogenization of the fuel by the intake-stroke injection at the early period side, and the degradation of the ignitability and the combustibility at the retarded ignition timing is prevented.

In the control device, when there is the request for the ignition retard during a combustion control in which at least a target air-fuel ratio becomes higher than a stoichiometric air-fuel ratio, the combustion controlling module may execute the control in which the portion of the entire fuel is injected in the compression stroke, while performing the injection in the intake stroke, and the ignition timing is retarded from the basic ignition timing.

Among operation ranges of a vehicle, especially in a low/middle load and low speed operating range, there are many cases in which the ignition and the combustion are performed in a lean state where the target air-fuel ratio becomes higher than the stoichiometric air-fuel ratio for the sake of securing combustibility, etc. Therefore, according to this configuration, in the low/middle load and low speed operating range, the ignition retarding amount can be increased while maintaining combustion stability.

In the control device, the ignition retard determining module, especially which determines that there is the request for the ignition retard when there is the torque-down request, may determine that there is the request for the ignition retard, when a request for an upshift for upshifting a gear stage of a transmission coupled to the engine is received.

According to this configuration, since flexibility of the torque-down amount during the upshift is increased, a gear-shift shock during the upshift can be effectively reduced.

In the control device, the ignition retard determining module, which determines that there is the request for the ignition retard when there is the torque-down request, may determine that there is the request for the ignition retard, when a request for temporarily reducing a driving torque of wheels of a vehicle in order to secure drivability is received.

According to this configuration, since the flexibility of the torque-down amount when there is the request for reducing the driving torque of the wheels is increased, it becomes possible to secure the drivability of the vehicle at a higher level, during cornering, etc.

According to another aspect of the present disclosure, a method of controlling an engine is provided. The method includes controlling an ignition plug disposed in a combustion chamber and an injector configured to inject fuel into the combustion chamber so that partial compression ignition combustion in which spark ignition (SI) combustion of a portion of a mixture gas inside the combustion chamber is carried out by flame propagation from an ignited point of the ignition plug, and compression ignition (CI) combustion of the remaining mixture gas is carried out by self-ignition is performed, determining whether there is a request for an ignition retard for retarding an ignition timing of the ignition plug, and when controlling the ignition plug and the injector so that the partial compression ignition combustion is performed and there is not the request for the ignition retard, executing a control in which the entire fuel to be injected in one cycle is injected in an intake stroke and jump-spark ignition is carried out at a basic ignition timing set according to an operating condition of the engine, and when there is the request for the ignition retard, executing a control in which an injection is performed in an intake stroke, a portion of the entire fuel is injected in a compression stroke, and the ignition timing is retarded from the basic ignition timing.

DETAILED DESCRIPTION OF THE DISCLOSURE

Hereinafter, one embodiment of the present disclosure is described in detail with reference to the accompanying drawings.

1. Overall Configuration of Engine

Figure 1:
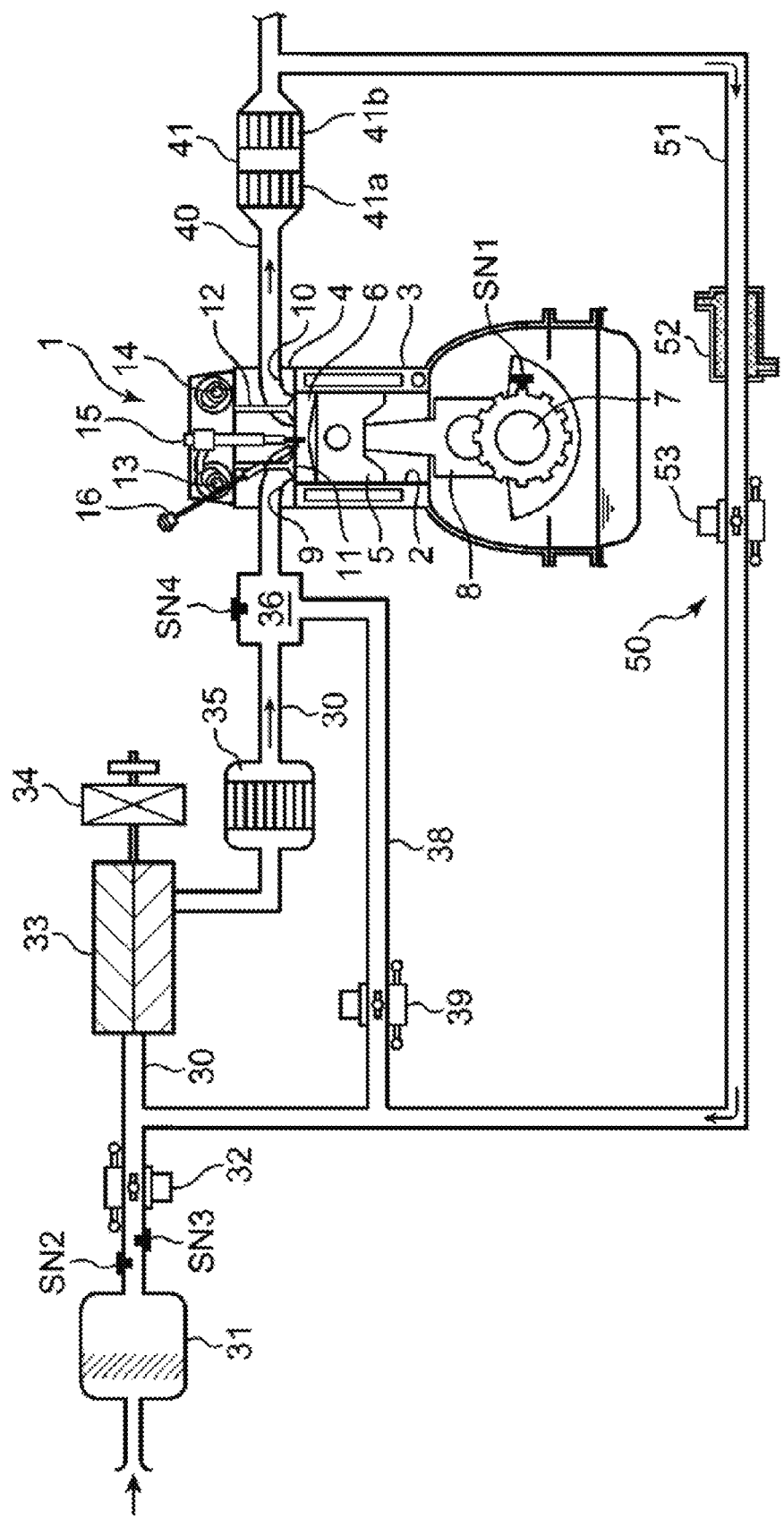
FIG. 1 is a system diagram schematically illustrating an entire configuration of an engine to which the present disclosure is applied.

FIG. 1 is a view illustrating a preferable embodiment of an engine for a vehicle to which a control device of the present disclosure is applied (hereinafter, simply referred to as "the engine"). The engine illustrated in this figure is a four-cycle gasoline direct-injection engine mounted on the vehicle as a propelling source of the vehicle, and includes an engine body 1, an intake passage 30 where intake air introduced into the engine body 1 circulates, an exhaust passage 40 where exhaust gas discharged from the engine body 1 circulates, and an external exhaust gas recirculation (EGR) device 50 which recirculates a portion of exhaust gas which circulates through the exhaust passage 40 to the intake passage 30.

The engine body 1 has a cylinder block 3 where cylinders 2 are formed therein, a cylinder head 4 attached to an upper surface of the cylinder block 3 so as to cover up the cylinder 2 from above, and pistons 5 reciprocatably inserted in the respective cylinders 2. Although the engine body 1 is typically a multi-cylinder type having a plurality of cylinders (e.g., four), only one of the cylinders 2 is described herein for simplifying the description.

A combustion chamber 6 is defined above the piston 5, and fuel comprised of gasoline as its main component is supplied to the combustion chamber 6 by an injection from an injector 15 (described later). Then, the supplied fuel combusts inside the combustion chamber 6 while being mixed with air, and the expansive force produced by the combustion pushes the piston 5 to make the piston 5 reciprocate in the vertical direction.

Below the piston 5, a crankshaft 7 which is an output shaft of the engine body 1 is provided. The crankshaft 7 is connected with the piston 5 through a connecting rod 8, and is rotated on its center axis by the reciprocating motion (up-and-down motion) of the piston 5.

The crankshaft 7 is coupled to an automatic transmission 60 (illustrated in FIG. 2) through a torque converter outside this figure. The automatic transmission 60 includes a built-in multi-stage transmission mechanism (not illustrated) which can achieve a plurality of gear stages having different gear ratios. The transmission mechanism has, for example, a planetary gear mechanism, a plurality of friction engagement components including a clutch and a brake for changing a power transmitting path of the planetary gear mechanism, and a hydraulic control valve comprised of a solenoid valve which controls the oil pressure supplied to each friction engagement component to switch between its engagement state and disengagement state.

A geometric compression ratio of the cylinder 2, i.e., a ratio of a volume of the combustion chamber 6 when the piston 5 is at a top dead center to a volume of the combustion chamber 6 when the piston 5 is at a bottom dead center is set to a high compression ratio, 13:1 or higher and 30:1 or lower, and preferably 14:1 or higher and 18:1 or lower, as a suitable value for SPCCI combustion (partial compression ignition combustion) described later. By setting the geometric compression ratio to the high compression ratio of 14:1 or higher, it can achieve an environment in which compression ignition of a mixture gas is more easily caused inside the combustion chamber 6.

A crank angle sensor SN1 which detects a rotation angle of the crankshaft 7 (crank angle) and a rotational speed of the crankshaft 7 (engine speed) is provided to the cylinder block 3.

The cylinder head 4 is provided with an intake port 9 for introducing air supplied from the intake passage 30 into the combustion chamber 6, an exhaust port 10 for leading exhaust gas generated inside the combustion chamber 6 to the exhaust passage 40, an intake valve 11 which opens and closes an opening of the intake port 9 at the combustion chamber 6 side, and an exhaust valve 12 which opens and closes an opening of the exhaust port 10 at the combustion chamber 6 side.

The intake valve 11 and the exhaust valve 12 are driven by a valve operating mechanism including a pair of cam shafts disposed in the cylinder head 4 to be opened and closed in an interlocked manner with the rotation of the crankshaft 7.

An intake VVT 13 which can change the opening-and-closing timings of the intake valve 11 is built in the valve operating mechanism for the intake valve 11. Similarly, an exhaust VVT 14 which can change the opening-and-closing timings of the exhaust valve 12 is built in the valve operating mechanism for the exhaust valve 12. The intake VVT 13 (exhaust VVT 14) is a so-called phase variable mechanism, and changes the open timing and the close timing of the intake valve 11 (exhaust valve 12) simultaneously by the same amount by the operation of an electric motor.

The cylinder head 4 is provided with the injector 15 which injects fuel (gasoline) into the combustion chamber 6, and an ignition plug 16 which ignites the mixture gas in which the fuel injected into the combustion chamber 6 from the injector 15 is mixed with intake air.

The intake passage 30 is connected to one side surface of the cylinder head 4 so as to communicate with the intake port 9. Air (fresh air) taken in from an upstream end of the intake passage 30 is introduced into the combustion chamber 6 through the intake passage 30 and the intake port 9.

The intake passage 30 is provided with, from the upstream side, an air cleaner 31 which removes the foreign substance in the intake air, a throttle valve 32 which can open and close to adjust a flow rate of the intake air, a supercharger 33 which pumps the intake air while compressing the intake air, an intercooler 35 which cools the intake air which is compressed by the supercharger 33, and a surge tank 36.

Respective parts of the intake passage 30 are provided with an airflow sensor SN2 which detects a flow rate of the intake air, an intake air temperature sensor SN3 which detects the temperature of the intake air, and an intake pressure sensor SN4 which detects the pressure of the intake air. The airflow sensor SN2 and the intake air temperature sensor SN3 are provided to a part of the intake passage 30 between the air cleaner 31 and the throttle valve 32, and detect the flow rate and the temperature of the intake air which passes through this part, respectively. The intake pressure sensor SN4 is provided to the surge tank 36 and detects the pressure of the intake air inside the surge tank 36.

The supercharger 33 is a mechanical supercharger which is mechanically coupled to the engine body 1. As the supercharger 33, any one of known superchargers, such as a Lysholm type, a root type, and a centrifugal type, can be used.

Between the supercharger 33 and the engine body 1, an electromagnetic clutch 34 which can electrically switch between its engagement state and disengagement state is provided. When the electromagnetic clutch 34 is engaged, the driving force is transmitted to the supercharger 33 from the engine body 1, and boosting by the supercharger 33 is then performed. On the other hand, when the electromagnetic clutch 34 is disengaged, the transmission of the driving force is intercepted, and the boosting by the supercharger 33 is suspended.

The intake passage 30 is provided with a bypass passage 38 for bypassing the supercharger 33. The bypass passage 38 connects the surge tank 36 with an EGR passage 51 (described later). The bypass passage 38 is provided with a bypass valve 39 which can be opened and closed.

The exhaust passage 40 is connected to the other side surface of the cylinder head 4 so as to communicate with the exhaust port 10. The burnt gas generated inside the combustion chamber 6 is discharged outside through the exhaust port 10 and the exhaust passage 40.

The exhaust passage 40 is provided with a catalytic converter 41. A three-way catalyst 41a for purifying hazardous components (HC, CO, and $NO_x$) contained in exhaust gas circulating the exhaust passage 40, and a GPF (Gasoline Particulate Filter) 41b for collecting of particulate matter (PM) contained in the exhaust gas are built in the catalytic converter 41.

The external EGR device 50 has the EGR passage 51 which connects the exhaust passage 40 with the intake passage 30, and an EGR cooler 52 and an EGR valve 53 provided to the EGR passage 51. The EGR passage 51 connects a part of the exhaust passage 40 downstream of the catalytic converter 41 with a part of the intake passage 30 between the throttle valve 32 and the supercharger 33. The EGR cooler 52 cools exhaust gas which recirculates from the exhaust passage 40 to the intake passage 30 through the EGR passage 51 (external EGR gas) by heat exchange. The EGR valve 53 is provided to the EGR passage 51 downstream of the EGR cooler 52 (closer to the intake passage 30) so as to be opened and closed, and adjusts a flow rate of exhaust gas which circulates the EGR passage 51.

2. Control System

Figure 2:
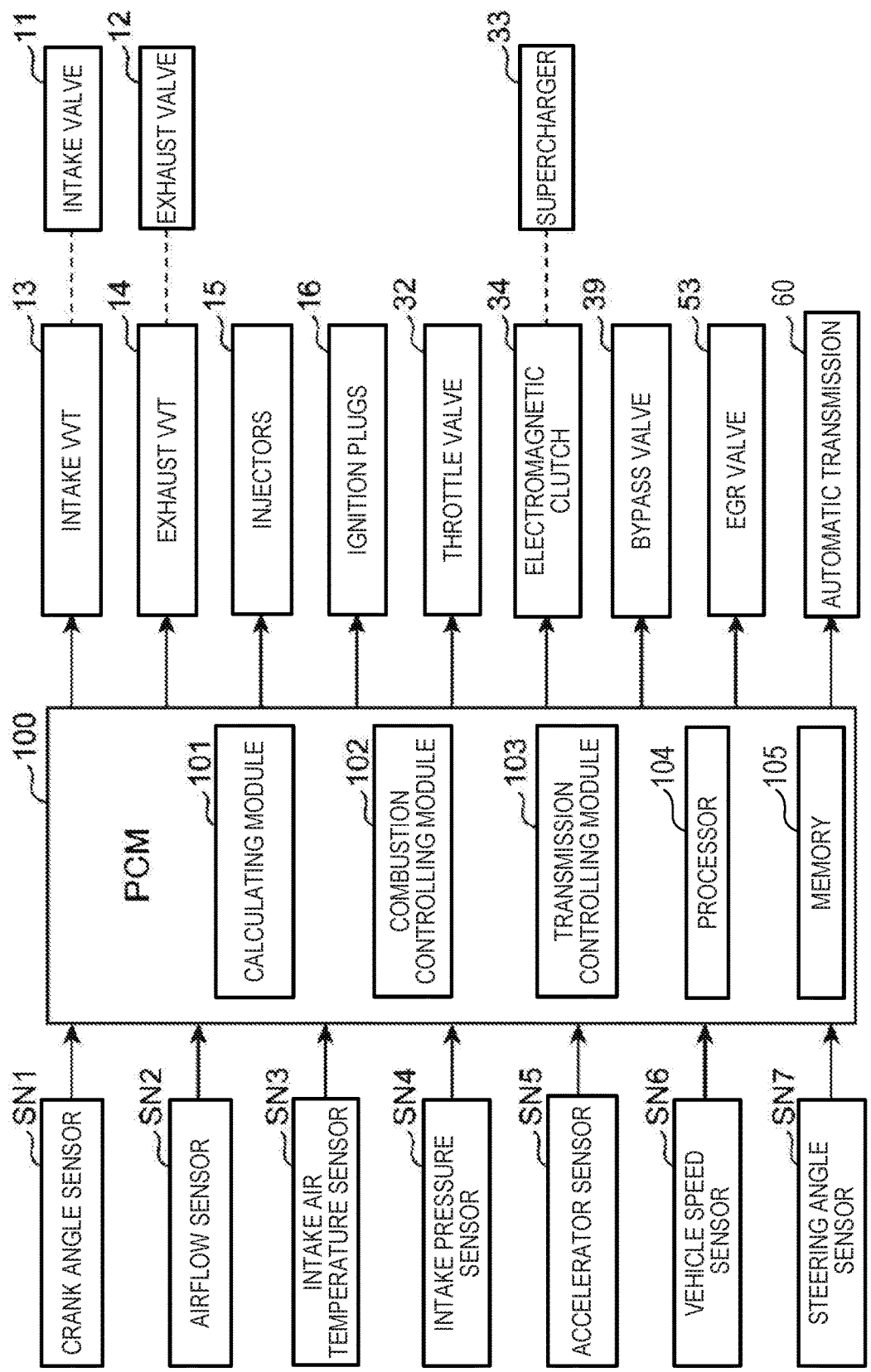
FIG. 2 is a block diagram illustrating a control system of the engine.

FIG. 2 is a block diagram illustrating a control system of the engine. A PCM (powertrain control module) 100 illustrated in this figure is a microprocessor for comprehensively controlling the engine, etc., and is comprised of a processor 104 (e.g., a central processing unit (CPU)) having associated ROM, RAM, etc. which are well known.

Detection signals of various sensors are inputted into the PCM 100. For example, the PCM 100 is electrically connected to the crank angle sensor SN1, the airflow sensor SN2, the intake air temperature sensor SN3, and the intake pressure sensor SN4, which are described above. Information detected by these sensors (i.e., a crank angle, an engine speed, an intake air flow rate, an intake air temperature, and an intake pressure) are sequentially inputted into the PCM 100.

Moreover, the vehicle is provided with an accelerator sensor SN5 which detects an opening of an accelerator pedal (hereinafter, referred to as "the accelerator opening") operated by a driver who operates the vehicle, a vehicle speed sensor SN6 which detects a traveling speed of the vehicle (hereinafter, referred to as "the vehicle speed"), and a steering angle sensor SN7 which detects a steering angle of a steering wheel operated by the driver. Detection signals of these sensors SN5-SN7 are also sequentially inputted into the PCM 100.

The PCM 100 controls each part of the engine, while performing various determinations, calculations, etc. based on the input information from the corresponding sensor(s). That is, the PCM 100 is electrically connected, for example, to the intake VVT 13, the exhaust VVT 14, the injector 15, the ignition plug 16, the throttle valve 32, the electromagnetic clutch 34, the bypass valve 39, the EGR valve 53, and the automatic transmission 60 (in detail, the hydraulic control valve, such as the solenoid valve built in the transmission), and based on the result(s) of the calculation(s), etc., it outputs a control signal to the corresponding device.

In detail, the PCM 100 executes software modules to achieve their respective functions, including a calculating module 101, a combustion controlling module 102, and a transmission controlling module 103. These modules are stored in memory 105 as software. Note that the calculating module 101 is an example of an "ignition retard determining module" and a "combustibility estimating module" of the present disclosure.

The combustion controlling module 102 is a controlling module which controls combustion of the mixture gas inside the combustion chamber 6, and controls each part of the engine (the intake VVT 13, the exhaust VVT 14, the injector 15, the ignition plug 16, etc.) so that the engine output torque becomes a suitable value according to a request of the driver, for example. The transmission controlling module 103 is a controlling module which controls the automatic transmission 60, and controls the hydraulic control valve, etc. so that a suitable gear stage according to the traveling state of the vehicle is obtained as the gear stage of the automatic transmission 60. The calculating module 101 is a controlling module which performs various calculations, such as determining a control target value for each of the controlling modules 102 and 103, and determining the operating state of the engine.

3. Control According to Operating State

Figure 3:
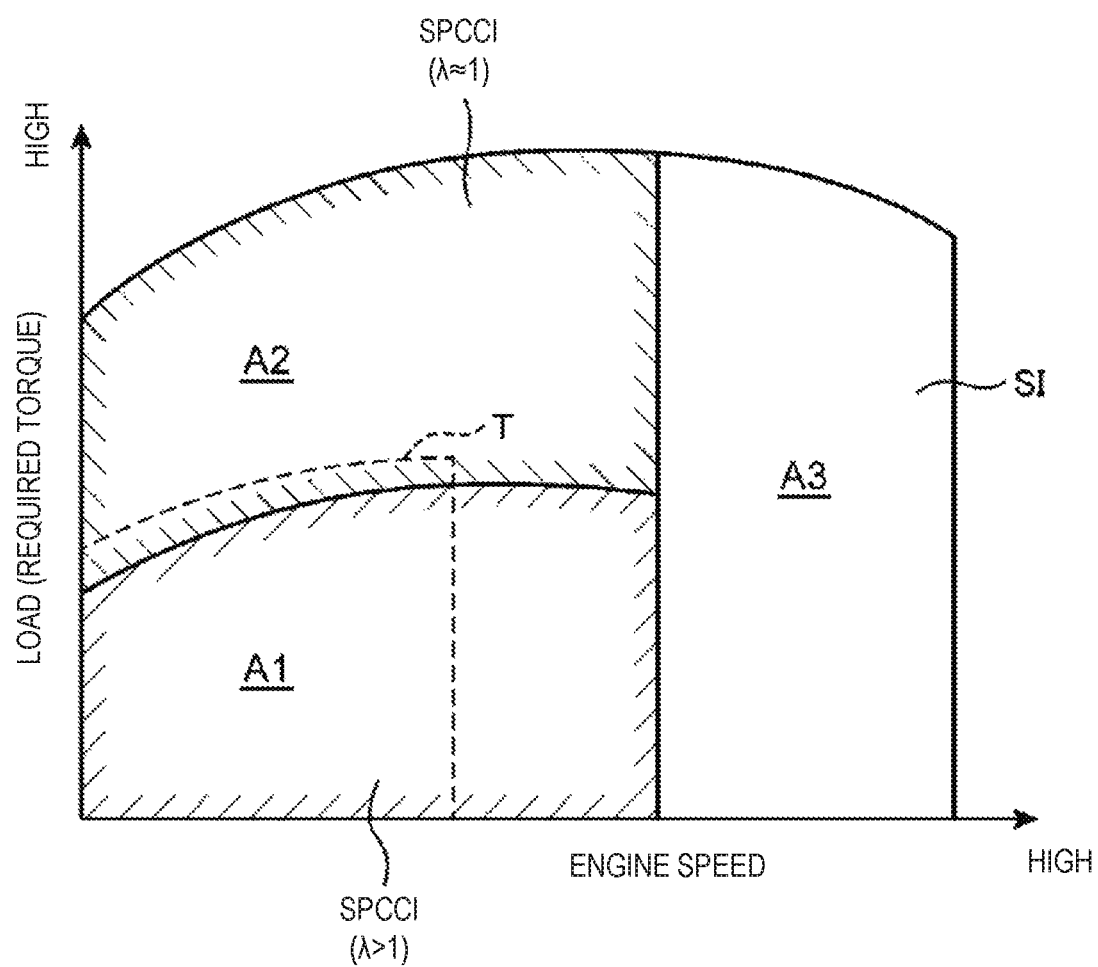
FIG. 3 is an operation map in which an operating range of the engine is classified by the difference of a combustion mode.

FIG. 3 is an operation map illustrating a difference of the control according to the engine speed and the load. As illustrated in this figure, the engine operating range is roughly divided into three operating ranges A1-A3 by the difference in a combustion mode. These operating ranges A1-A3 are referred to as a first operating range A1, a second operating range A2, and a third operating range A3. The third operating range A3 is a high-speed range where the engine speed is high. The first operating range A1 is a low/middle-speed and low-load range excluding a high-load part from the low-speed side of the third operating range A3. The second operating range A2 is a remaining range other than the first and third operating ranges A1 and A3 (i.e., a low/middle-speed and high-load range). Below, a basic combustion control selected in each of the operating ranges A1-A3 is described.

<First Operating Range>

In the first operating range A1 with the low/middle speed and the low load, partial compression ignition combustion in which spark ignition (SI) combustion and compression ignition (CI) combustion are combined is performed (hereinafter, referred to as SPCCI combustion). SI combustion is a combustion mode in which the mixture gas is ignited by sparks generated from the ignition plug 16, and the mixture gas is forcibly combusted by flame propagation which extends a combustion range from an ignited point to the perimeter. CI combustion is a combustion mode in which the mixture gas is combusted by self-ignition under the environment where the mixture gas is brought to a sufficiently high temperature and high pressure by compression of the piston 5. The SPCCI combustion which is the combination of SI combustion and CI combustion is a combustion mode in which SI combustion of a portion of the mixture gas inside the combustion chamber 6 is carried out by jump-spark ignition performed under the environment where the mixture gas is about to self-ignite, and CI combustion of the remaining mixture gas inside the combustion chamber 6 is carried out by a self-ignition after the SI combustion (i.e., by the further increase in the temperature and the pressure accompanying the SI combustion). Note that "SPCCI" is an abbreviation for "SPark Controlled Compression Ignition."

Figure 4:
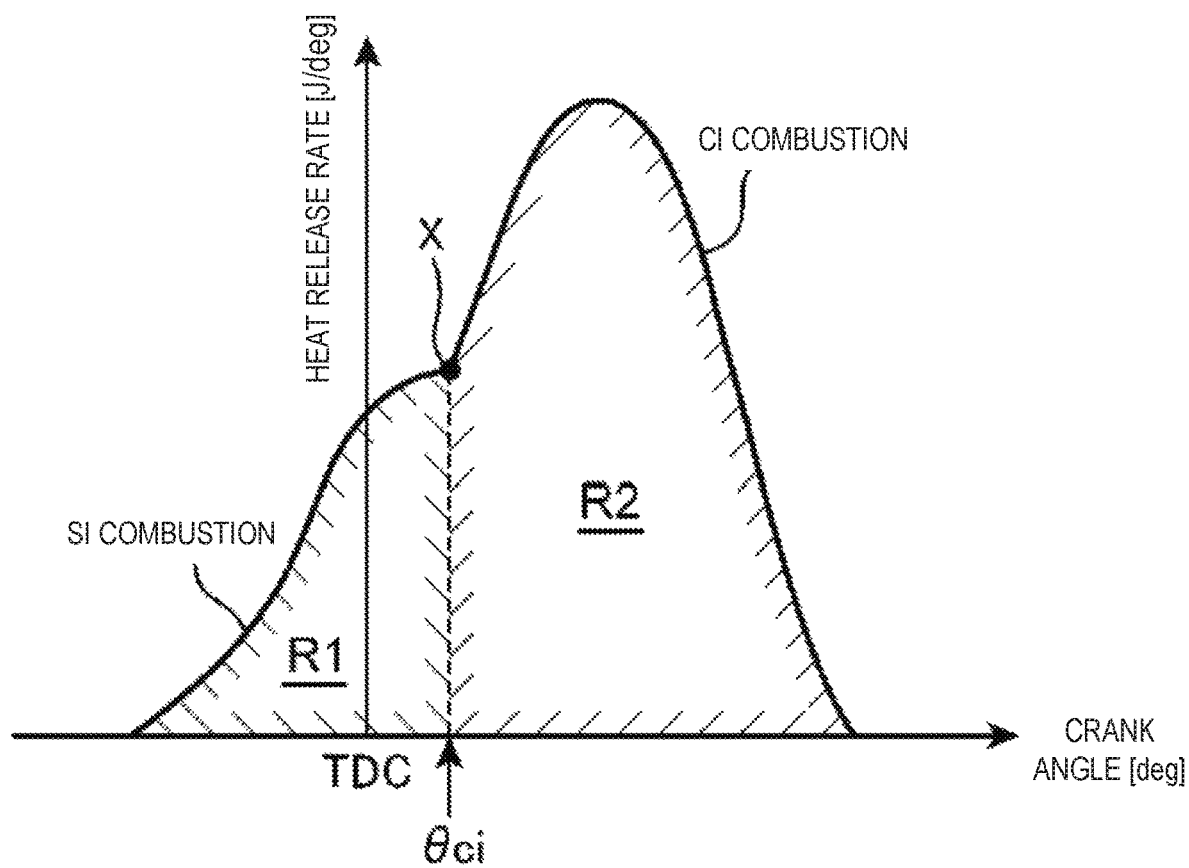
FIG. 4 is a graph illustrating a waveform of a rate of heat release during SPCCI combustion (partial compression ignition combustion).

FIG. 4 is a graph illustrating a combustion waveform, i.e., a change in a rate of heat release (J/deg) by a crank angle, when the SPCCI combustion described above is performed. As illustrated in this figure, in SPCCI combustion, a heat release by SI combustion and a heat release by CI combustion are continuously generated in this order. At this time, due to the nature in which a combusting rate of CI combustion is quicker, a rise of the heat release of CI combustion is steeper than that of SI combustion. For this reason, the waveform of the rate of heat release in SPCCI combustion has a point of inflection X which appears at a timing of switching from SI combustion to CI combustion (θci, described later).

Here, in SPCCI combustion which is the combination of SI combustion and CI combustion, a ratio of SI combustion and CI combustion is controlled according to the operating condition. In this embodiment, each part of the engine is controlled so that a SI ratio which is a ratio of an amount of heat release by SI combustion to the total amount of heat release by SPCCI combustion (SI combustion and CI combustion) becomes an appropriate value.

The SI ratio can be defined as follows. In FIG. 4, suppose that the crank-angle θci corresponding to the point of inflection X at which the combustion mode changes from SI combustion to CI combustion is a start timing of CI combustion. In this case, the amount of heat release by SI combustion corresponds to a waveform area R1 of the rate of heat release at the advancing side of θci (start timing of CI combustion), and the amount of heat release by CI combustion corresponds to a waveform area R2 of the rate of heat release at the retarding side of θci. The SI ratio can be defined as R1/(R1+R2) using the areas R1 and R2.

In the first operating range A1 where SPCCI combustion is performed, each part of the engine is controlled so that the SI ratio and θci which are described above match with target values defined beforehand. That is, in the first operating range A1, a target SI ratio which is a target value of the SI ratio and a target θci which is a target value of θci are defined, respectively, for each of various conditions with different engine loads and speeds. Then, a plurality of parameters, such as a timing of jump-spark ignition by the ignition plug 16 (ignition timing), an injection amount and an injection timing of fuel from the injector 15, and an EGR rate (an external EGR rate and an internal EGR rate) are controlled so as to become a combination which can realize the target SI ratio and the target θci. Note that the external EGR rate is a weight ratio of the external EGR gas (exhaust gas which recirculates to the combustion chamber 6 through the EGR passage 51) to the entire gas inside the combustion chamber 6. The internal EGR rate is a weight ratio of the internal EGR gas (burnt gas which remains inside the combustion chamber 6 by the internal EGR) to the entire gas inside the combustion chamber 6.

For example, the ignition timing, and the injection amount and the injection timing of fuel are determined by a map defined beforehand in consideration of the target SI ratio and the target θci. That is, the ignition timing, and the injection amount and the injection timing of fuel suitable for realizing the target SI ratio and the target θci are stored in the map for every condition of the engine load and the engine speed. The PCM 100 controls the injector 15 and the ignition plug 16 according to the ignition timing, and the injection amount and the injection timing stored in the map.

On the other hand, the external EGR rate and the internal EGR rate are determined by a calculation using a given model formula. That is, the PCM 100 calculates, for every combustion cycle, an in-cylinder temperature required at a timing of a jump-spark ignition in order to realize the target SI ratio and the target θci (a target in-cylinder temperature) by using the given model formula, and determines an opening of the EGR valve 53 and valve timings of the intake and exhaust valves 11 and 12 based on the temperature in this calculated target cylinder. In more detail, the PCM 100 calculates the external EGR rate and the internal EGR rate required for realizing the target in-cylinder temperature by substituting various parameters including a temperature of intake air (fresh air) detected by the intake air temperature sensor SN3, and a close timing of the intake valve 11 (IVC) which is a timing at which compression in the combustion chamber 6 is substantially started, in the model formula which uses the parameters as input elements. Then, an opening of the EGR valve 53 required for realizing the calculated external EGR rate is calculated as a target valve opening, and the EGR valve 53 is controlled so that the target valve opening is realized.

Figure 5:
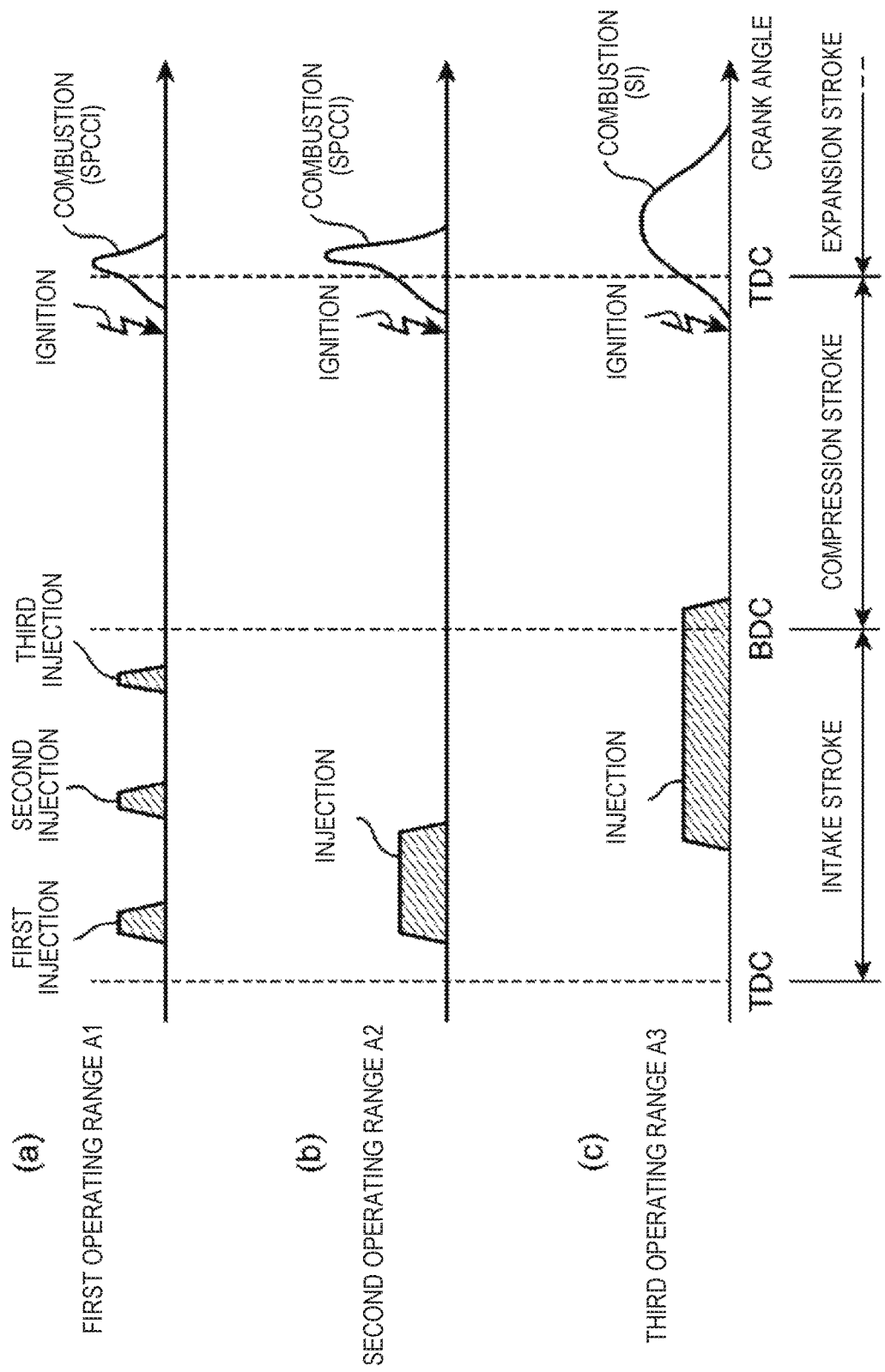
FIG. 5 is a time chart schematically illustrating one example of a combustion control (a basic ignition timing, and a basic injection amount and a basic injection timing) performed in each operating range of the engine.

FIG. 5 is a time chart illustrating one example of the ignition timing, and the injection amount and the injection timing of fuel in each operating range defined by the map, i.e., the combustion control performed in each operating range.

As illustrated in Chart (a) of this figure, the injection timing of fuel in the first operating range A1 is set so that fuel to be injected in one cycle is injected in three steps (a first injection, a second injection, a third injection) during an intake stroke. The timing of the first injection is set in the early period of the intake stroke, the timing of the second injection is set in the middle period of the intake stroke, and the timing of the third injection is set in the later period of the intake stroke. The division ratio of the injection amount of each injection is set as the first injection>the second injection>the third injection.

The ignition timing in the first operating range A1 is set near a compression top dead center (e.g., a timing slightly at the advancing side of the compression top dead center).

Note that in the first operating range A1, the throttle valve 32 is controlled as follows, in conjunction with the control of the ignition timing, and the injection amount and the injection timing of fuel as described above. That is, the opening of the throttle valve 32 is fundamentally set such that more air is introduced into the combustion chamber 6 through the intake passage 30 than an air amount corresponding to a stoichiometric air-fuel ratio, i.e., it is set such that the air-fuel ratio (A/F) which is a weight ratio of air (fresh air) to fuel inside the combustion chamber 6 becomes higher than the stoichiometric air-fuel ratio (14.7:1) (an excess air factor λ>1).

<Second Operating Range>

Similar to the first operating range A1, SPCCI combustion which is the combination of SI combustion and CI combustion is also performed in the second operating range A2 where is the low/middle speed and the high load. The injection amount and the injection timing of fuel in the second operating range A2 are set so that the entire amount of fuel to be injected in one cycle is injected all at once during a given period from the early period to the middle period in the intake stroke, as illustrated in Chart (b) of FIG. 5.

The ignition timing in the second operating range A2 is set at a timing near a compression top dead center (e.g., slightly at the advancing side of the compression top dead center).

The opening of the throttle valve 32 is set so that the air amount corresponding to the stoichiometric air-fuel ratio is introduced into the combustion chamber 6, i.e., so that the A/F becomes substantially in agreement with the stoichiometric air-fuel ratio ($\lambda \approx 1$).

Note that in a part of the first and second operating ranges A1 and A2, specifically, in an inside range of a border of a boost line T illustrated in FIG. 3, the supercharger 33 is turned off, and outside the range, the supercharger 33 is turned on. In the inside range of the boost line T where the supercharger 33 is turned off, i.e., in a low-speed and low-load range, the electromagnetic clutch 34 is disengaged to release the coupling of the supercharger 33 and the engine body 1, and the boosting by the supercharger 33 is suspended by fully opening the bypass valve 39. On the other hand, in the range outside the boost line T where the supercharger 33 is turned on, i.e., in a partial range of the first operating range A1 excluding the low-speed and low-load range, the electromagnetic clutch 34 is engaged to couple the engine body 1 to the supercharger 33, thereby performing the boost by the supercharger 33. At this time, the opening of the bypass valve 39 is controlled so that the pressure inside the surge tank 36 (boost pressure) detected by the intake pressure sensor SN4 becomes in agreement with a target pressure defined beforehand for every condition of the engine load and the engine speed.

<Third Operating Range>

In the third operating range A3 at the higher speed side of the first and second operating ranges A1 and A2, normal SI combustion is performed. As illustrated in Chart (c) of FIG. 5, the injection amount and the injection timing of fuel in the third operating range A3 are set so that the entire amount of fuel to be injected in one cycle is injected all at once during a given period from an intake stroke to a compression stroke.

The ignition timing in the second operating range A2 is set as a timing near a compression top dead center (e.g., slightly at the advancing side of the compression top dead center). SI combustion is started triggered by jump-spark ignition, and all the mixture gas inside the combustion chamber 6 then combusts by flame propagation.

The throttle valve 32 is set to an opening so that the air amount corresponding to or less than the stoichiometric air-fuel ratio is introduced into the combustion chamber 6, i.e., the A/F inside the combustion chamber 6 becomes the stoichiometric air-fuel ratio or slightly richer than the stoichiometric air-fuel ratio ($\lambda \leq 1$).

Note that Charts (a) to (c) of FIG. 5 are representative examples of the ignition timing, and the injection amount and the injection timing of fuel in the respective operating ranges defined by the map, and the specific ignition timing, and the specific injection amount and the injection timing of fuel in each operating range may be somewhat different from the illustrated Charts (a) to (c) according to the engine load and the engine speed.

4. Control when Torque-Down is Requested

While the driving force of the engine described above is transmitted to the wheels through the automatic transmission 60, when an upshift which is to change the gear stage of the automatic transmission 60 to a higher gear (to reduce the gear ratio) is performed, the PCM 100 executes a control to temporarily reduce the engine output torque (torque down) for the purpose of reducing a gear-shift shock. Moreover, in order to simultaneously increase the maneuverability and the stability of the vehicle during cornering, etc. (in order to secure the drivability), the PCM 100 executes the control to temporarily reduce the engine output torque (a driving torque of the wheels) according to a steering wheel operation by the driver to optimize the grounding loads of the four wheels. That is, the engine output torque is temporarily reduced when entering a corner to move the vehicle weight to the front wheels to increase the grounding loads of the front wheels, and the engine output torque is then resumed to slightly return the vehicle weight to the rear wheels, thereby stabilizing the behavior of the vehicle during cornering.

Figure 6:
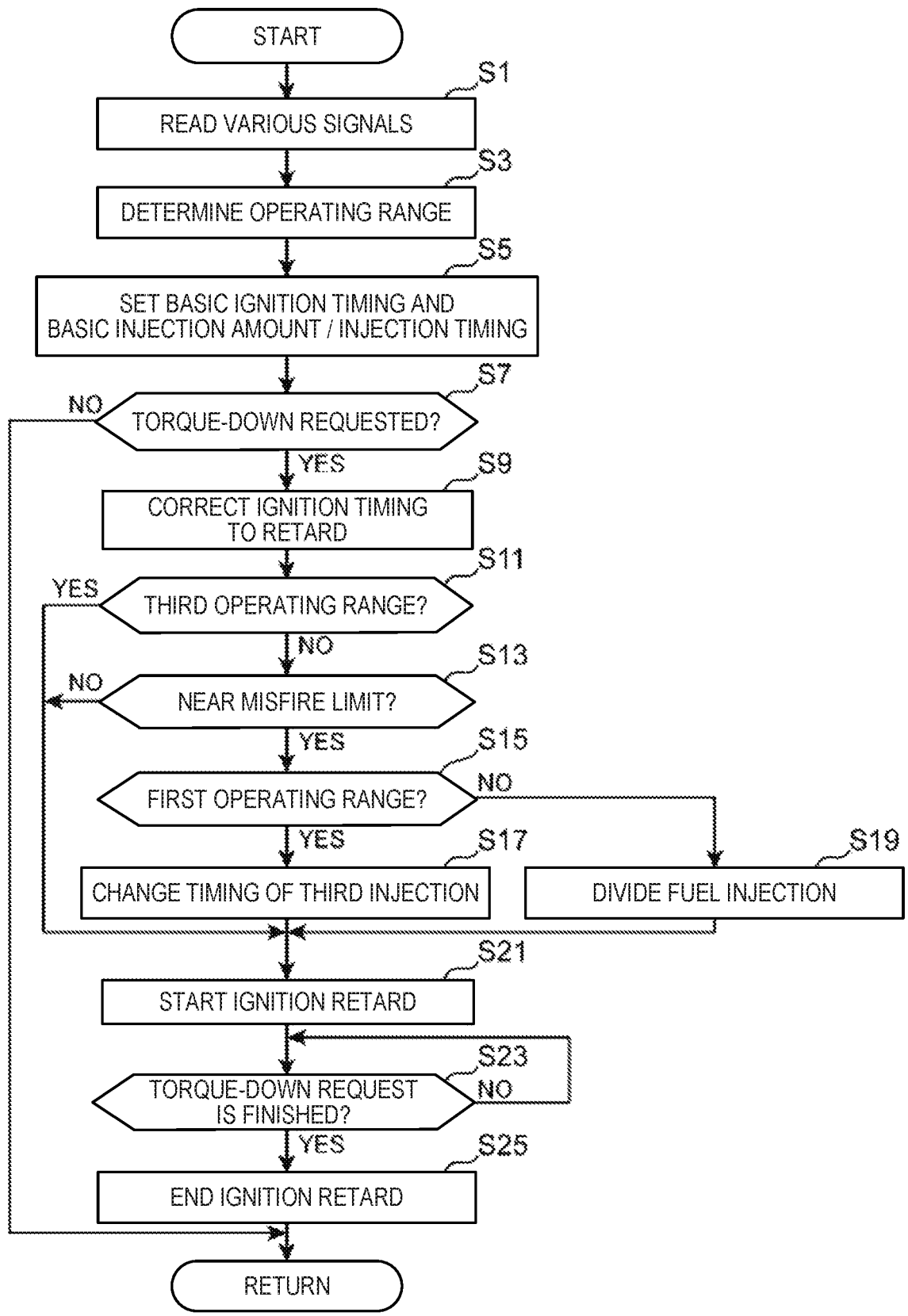
FIG. 6 is a flowchart illustrating a procedure of the control performed to the engine when there is a torque-down request.

Here, the control of the engine when there is the torque-down request, such as the upshifting and the cornering is described. FIG. 6 is a flowchart illustrating a procedure of the control performed to the engine when there is the torque-down request.

When the control illustrated in this flowchart starts, the calculating module 101 of the PCM 100 reads the output signals from the respective sensors (Step S1), and determines that in which operating range among the first to third operating ranges A1-A3 illustrating in FIG. 3 the present operating point of the engine falls (Step S3). In detail, the calculating module 101 identifies the engine load (required torque) based on the operating state of the accelerator pedal detected by the accelerator sensor SN5 and the intake air flow rate detected by the airflow sensor SN2, and based on this engine load and the engine speed detected by the crank angle sensor SN1, the calculating module 101 determines that in which operating range among the first to third operating ranges A1-A3 the present operating point of the engine falls.

When the present operating point of the engine is determined, the combustion controlling module 102 sets the ignition timing, and the injection amount and the injection timing of fuel, based on the map which defines the ignition timing, and the injection amount and the injection timing of fuel, and the present engine speed and engine load (Step S5). Thus, the ignition timing, and the injection amount and the injection timing of fuel set based on the map is referred to as "the basic ignition timing," and "the basic injection amount and the basic injection timing."

Next, the calculating module 101 determines whether there is a torque-down request for the engine (Step S7). In detail, when an upshift request is issued, the calculating module 101 determines that Step S7 is Yes. For example, while the vehicle travels in a state where 2nd gear (or 3rd gear or 4th gear or else) is selected as the gear stage, when at least any one of the engine speed, the accelerator opening, and the vehicle speed detected by the crank angle sensor SN1, the accelerator sensor SN5, and vehicle speed sensor SN6, respectively, changes, and the condition which is defined by a combination of these detected values suits a condition to select 3rd gear (or 4th gear or 5th gear or else), the calculating module 101 determines that the request for the upshift is issued, and in this case, it determines that Step S7 is Yes.

Moreover, the calculating module 101 also determines that Step S7 is Yes, for example, when entering a corner (and during cornering). That is, during the vehicle travels, the calculating module 101 identifies the optimum engine output torque (an output torque suitable for stabilizing the behavior of the vehicle), while referring to the map set beforehand, based on the combination of the vehicle speed detected by the vehicle speed sensor SN6 and the steering angle detected by the steering angle sensor SN7, and if the identified output torque is lower than the present required torque, the calculating module 101 determines that Step S7 is Yes.

If determined as Yes at Step S7, the combustion controlling module 102 corrects the ignition timing to the retarding side (retarding correction) from the basic ignition timing set at Step S5 according to an amount of the torque-down request (a difference between the present required torque and a torque required for the upshifting, etc.) (Step S9).

After the ignition timing is corrected, the calculating module 101 determines whether the present operating point of the engine is in the third operating range A3 (Step S11). Here, if determined as Yes, the control shifts to Step S21 where the combustion controlling module 102 executes a control for retarding the timing of jump-spark ignition by the ignition plug 16 (ignition timing). On the other hand, if determined as No, i.e., if the engine operating point is in the first operating range A1 or the second operating range A2, the calculating module 101 estimates the combustion state when retarding the ignition timing up to the timing after the correction at Step S9, by the calculation using the given combustion model formula, and then determines whether this combustion state is near a misfire limit (Step S13). That is, it is determined whether combustion stability is maintained, if the ignition timing is retarded while maintaining the basic injection amount and the basic injection timing. In detail, the calculating module 101 calculates a numerical value indicative of the combustion state by using the combustion model formula based on the basic injection amount, and the engine speed and the intake air flow rate which are detected by the crank angle sensor SN1 and the airflow sensor SN2, respectively. It is then determined whether the calculation result falls within a range where combustion stability can be evaluated to be maintained.

Here, if determined as No, the control shifts to Step S21 where the combustion controlling module 102 executes the retard control for the ignition timing of the ignition plug 16. On the other hand, if determined as Yes at Step S13, the calculating module 101 further determines whether the present operating point of the engine is in the first operating range A1 (Step S15), and according to the result, the combustion controlling module 102 corrects the injection timing of fuel from the basic injection timing set at Step S5 so that a portion of fuel to be injected in one cycle is injected during the compression stroke while performing (maintaining) the intake-stroke injection (Steps S17 and S19).

Figure 7:
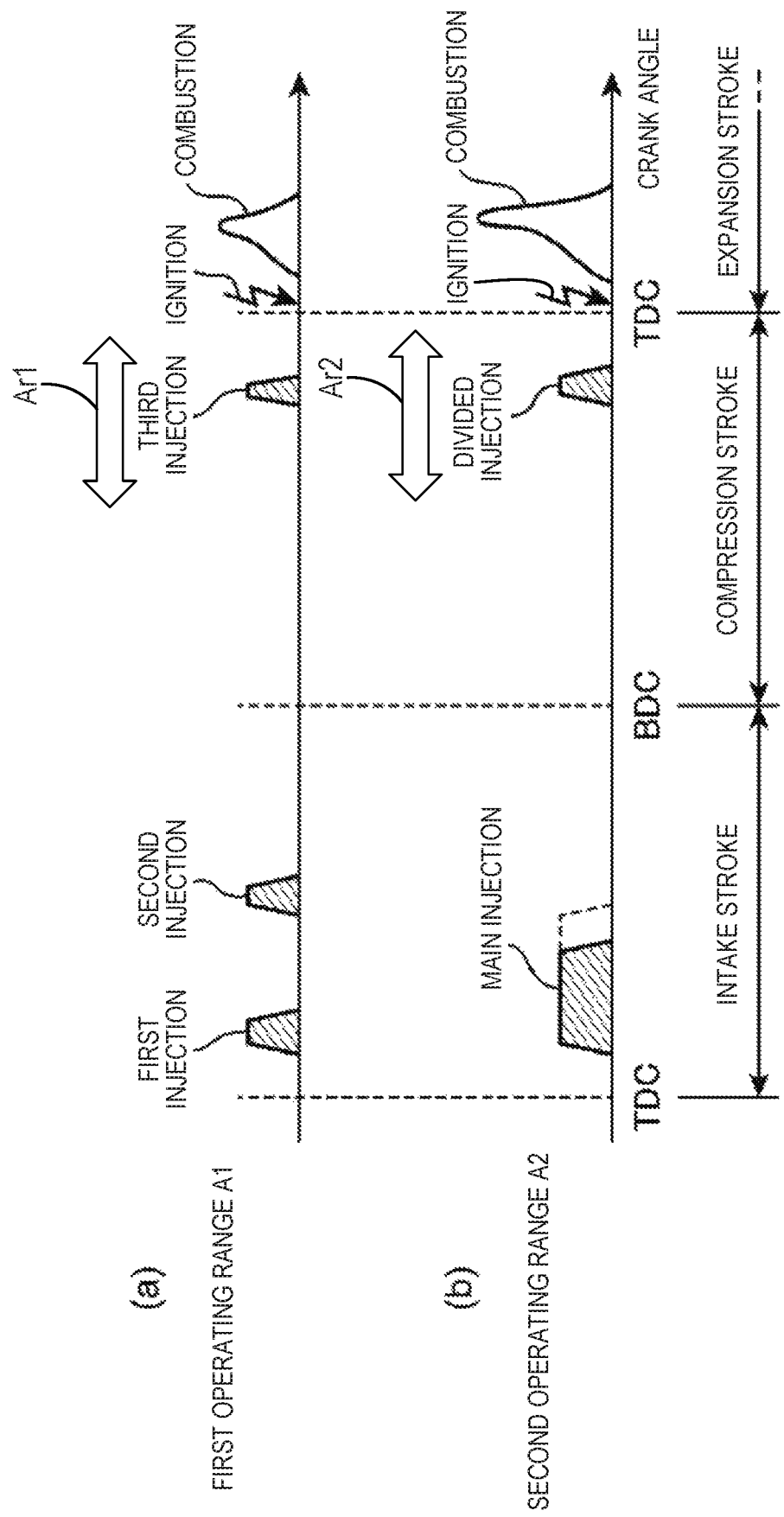
FIG. 7 is a time chart schematically illustrating a combustion control (a corrected injection amount and the injection timing) performed in first and second operating ranges during a torque-down request.

FIG. 7 is a time chart illustrating one example of the injection amount and the injection timing of fuel after the correction in the first and second operating ranges A1 and A2. If determined as Yes at Step S15 (i.e., if the operating point is in the first operating range A1), the combustion controlling module 102 carries out the retarding correction of the injection timing of fuel from the basic injection timing so that a part of fuel to be injected in one cycle is injected during compression stroke, as illustrated in Chart (a) of FIG. 7 (Step S17). In detail, the injection timing of the third, final injection among the first to third injections is changed from an intake-stroke injection into a compression-stroke injection. The injection amount of the third injection in this case is equivalent to the original injection amount (the injection amount of the third injection in the basic injection amount). The injection timing of the third injection is set according to the ignition timing within a range substantially ranging from the middle period to the later period of the compression stroke (a range illustrated by a white double arrow Ar1 in FIG. 7).

If determined as No at Step S15 (i.e., if the operating point is in the second operating range A2), the combustion controlling module 102 divides the injection timing of fuel so that a portion of fuel to be injected in one cycle is also injected in the compression stroke, as illustrated in Chart (b) of FIG. 7 (Step S19). In detail, the combustion controlling module 102 reduces the injection amount during the intake stroke, and corrects the injection timing so that the reduced amount of fuel is injected during the compression stroke. Here, if the injection of the intake stroke is referred to as a "main injection," and the injection of the compression stroke is referred to as a "divided injection," the injection timing of the divided injection is equivalent to the injection timing of the third injection set at Step S17. That is, the injection timing is set according to the ignition timing of the ignition plug 16 within a range illustrated by a white double arrow Ar2 (see FIG. 7).

Then, the combustion controlling module 102 shifts to Step S21, where it starts the control for retarding the timing of jump-spark ignition by the ignition plug 16 (ignition timing).

Next, the calculating module 101 determines whether the torque-down request is finished (Step S23). In detail, the calculating module 101 determines that the upshift is finished when the engine speed detected by the crank angle sensor SN1 falls to a synchronizing engine speed corresponding to the gear ratio after the upshift (i.e., the timing when the engine speed synchronization is finished), and it then determines as Yes at Step S23. Moreover, the calculating module 101 determines that the torque-down request is finished when it detects the steering wheel is operated to the opposite direction, after it detected that the vehicle entered into a corner (cornering) based on the steering angle detected by the steering angle sensor SN7.

If the combustion controlling module 102 determines that the torque-down request is finished, it ends the retard control of the ignition timing continued from Step S21, and then carries out a control for advancing the ignition timing to resume the original ignition timing (basic ignition timing) at Step S25, and the processing then returns to Step S1. Note that when the operating point is either the first operating range A1 or the second operating range A2, the combustion controlling module 102 executes a control for resuming the original injection timing (basic injection timing) also for the injection timing of fuel at Step S25.

Figure 8:
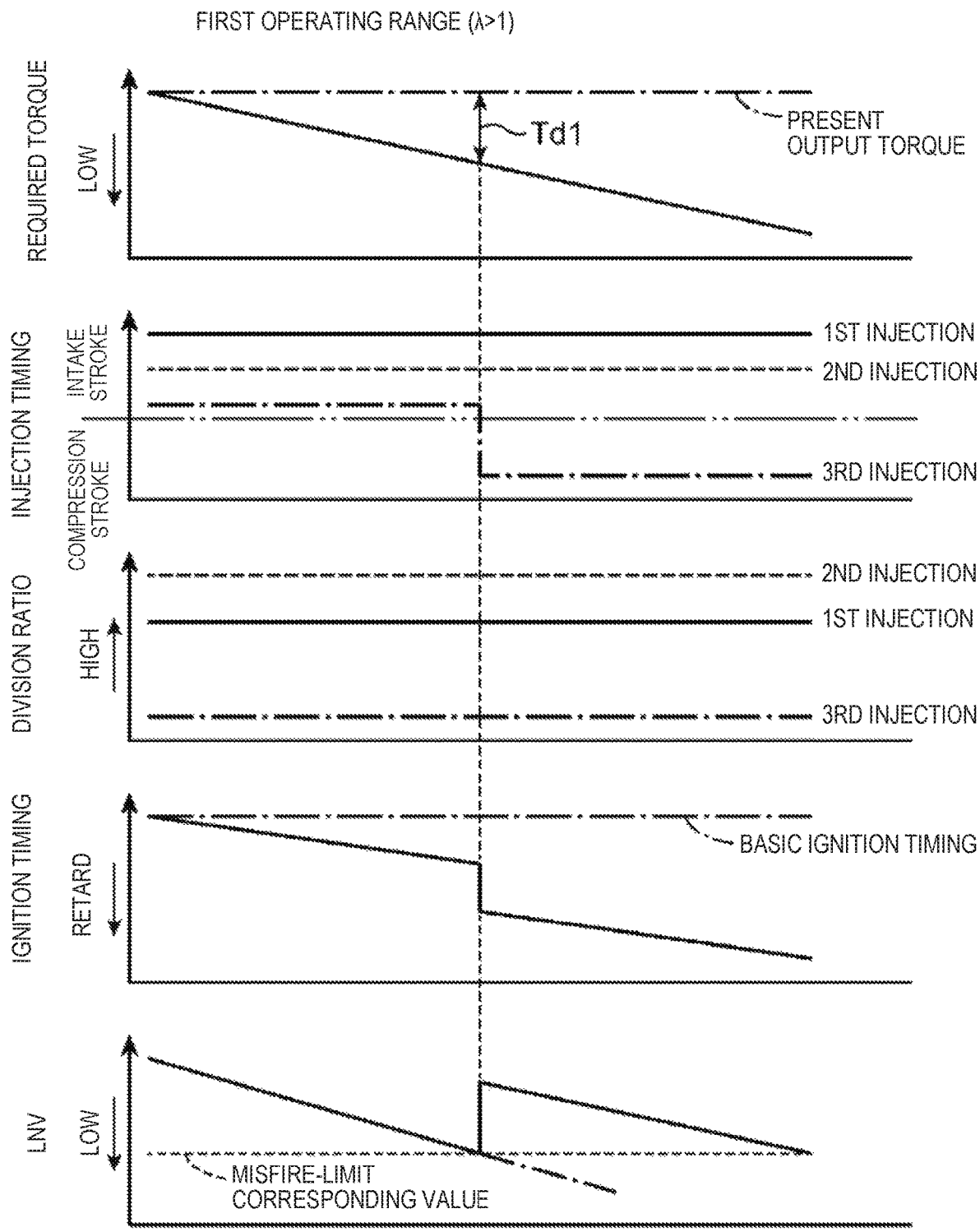
FIG. 8 is a graph schematically illustrating a relation between a required torque, an injection timing, an injecting fuel ratio, the ignition timing, and LNV, when the control of FIG. 6 is performed in the first operating range.
Figure 9:
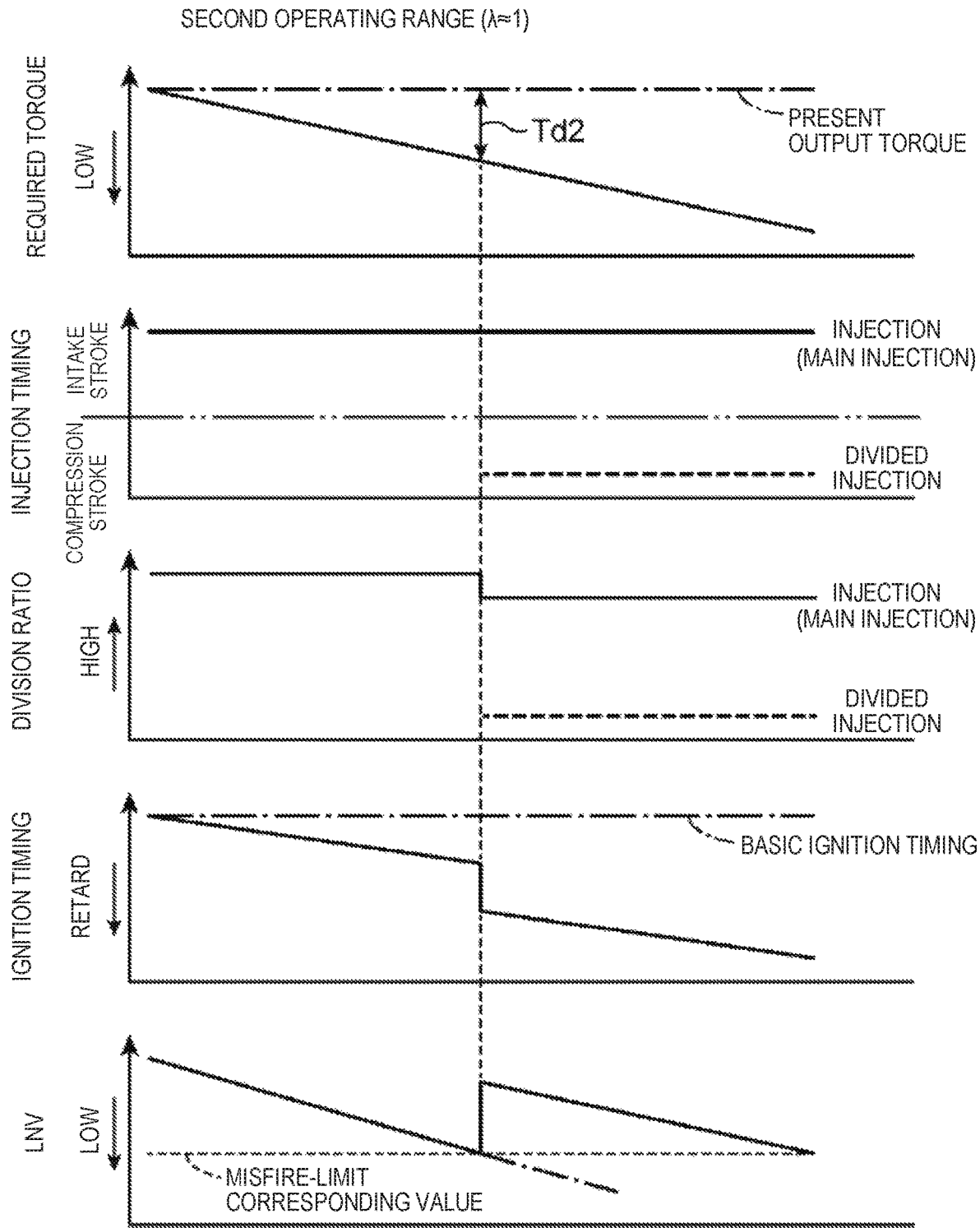
FIG. 9 is a graph schematically illustrating a relation between the required torque, the injection timing, the injecting fuel ratio, the ignition timing, and the LNV, when the control of FIG. 6 is performed in the second operating range.

FIGS. 8 and 9 are graphs schematically illustrating relations of the required torque, the injection timing, the injecting fuel ratio, the ignition timing, and the LNV in the control of the flowchart (FIG. 6) described above, where FIG. 8 illustrates the relation in the first operating range A1, and FIG. 9 illustrates the relation in the second operating range A2.

Note that the LNV (%) is one of indexes indicative of a combustion state, and is defined as [illustrated effective pressure (minimum) during combustion/illustrated effective pressure during combustion (average)]×100 in a given number of cycles (at least 300 cycles). That is, the LNV indicates that combustion stability becomes better as the LNV value becomes relatively high, and about 50% is equivalent to the misfire limit.

As illustrated in FIGS. 8 and 9, when there is the torque-down request, the ignition timing of the ignition plug 16 is retarded from the basic ignition timing (ignition timing set at Step S5 of FIG. 6), according to a torque-down request amount Td (a difference between the present required torque and the required torque for upshifting, etc.). That is, the ignition timing is more retarded, relatively as the torque-down request amount Td becomes larger.

In this case, with a range of the retarding amount where combustion stability may be maintained, i.e., a range of the retarding amount where the LNV value does not reach a misfire-limit corresponding value, in detail, in FIGS. 8 and 9, a range where the torque-down request amount is less than Td1 (Td2), the basic injection amount and the basic injection timing (the injection amount and the injection timing of fuel set at Step S5 of FIG. 6) are maintained, and only the ignition timing of the ignition plug 16 is retarded. That is, when the operating point is in the first operating range A1, the fuel to be injected in one cycle is injected in three steps comprised of the early period, the middle period, and the later period of the intake stroke (the first injection, the second injection, the third injection) as illustrated in FIG. 8 (Chart (a) of FIG. 5), and when the operating point is in the second operating range A2, the fuel to be injected in one cycle is injected all at once over a given period of the intake stroke from the early period to the middle period as illustrated in FIG. 9 (Chart (b) of FIG. 5). Note that the one-dot chain line portion in the chart illustrating the LNV in FIGS. 8 and 9 indicates the LNV value when only the ignition timing of the ignition plug 16 is retarded according to the torque-down request amount Td, while maintaining the basic injection amount and the basic injection timing.

On the other hand, in a range of the retarding amount where combustion stability may be degraded significantly if only the ignition timing of the ignition plug 16 is retarded while maintaining the basic injection amount and the basic injection timing, in detail, in a range where the torque-down request amount Td is more than Td1 (Td2), the injection timing of fuel is changed so that a portion of fuel to be injected in one cycle is injected during the compression stroke, while maintaining the intake-stroke injection. In detail, when the operating point is in the first operating range A1 as illustrated in FIG. 8, the injection timing of the third, final injection among the first to third injections is changed from the intake-stroke injection into the compression-stroke injection (Chart (a) of FIG. 7), and when the operating point is in the second operating range A2, the injection amount during an intake stroke (the injection amount of the main injection) is reduced, and the injection timing of fuel is changed so that the reduced amount of fuel is injected during the compression stroke as the divided injection (Chart (b) of FIG. 7). Thus, by changing the injection timing of the portion of fuel to be injected in one cycle from the intake stroke to the compression stroke, the air-fuel ratio around the ignition plug at the retarded ignition timing becomes in a rich state, while maintaining the homogenization of the fuel by the intake-stroke injection at the early period side, and degradation of the ignitability and the subsequent combustibility of the mixture gas is prevented, and, therefore, a significant degradation in combustion stability accompanying the retard of the injection timing is avoided. Note that the ignition timing may be changed to a timing retarded from a compression top dead center by the control at Steps S9 and S21 of FIG. 6. When the ignition timing is greatly retarded and is set at the retarding side of the compression top dead center, the combustion mode caused inside the combustion chamber 6 becomes difficult to maintain SPCCI combustion, and may be changed into SI combustion. That is, the retard control for the ignition timing described above is a control which is possible to retard the ignition timing to a timing at which the combustion mode changes from SPCCI combustion to SI combustion in the first and second operating ranges A1 and A2.

5. Operation and Effects

As described above, according to the engine of this embodiment, the ignition timing of the ignition plug 16 is retarded from the basic ignition timing, when there is an upshift of the gear stage of the automatic transmission 60, and the torque-down request in connection with a cornering of the vehicle. In this case, especially for the first and second operating ranges A1 and A2 where SPCCI combustion is performed, when combustion stability after the retard is estimated and it is estimated that combustion stability will not be significantly degraded, the portion of fuel to be injected in one cycle is injected during an intake stroke, whereas when it is estimated that combustion stability will be significantly degraded, the portion of fuel to be injected in one cycle is injected during a compression stroke while maintaining the intake-stroke injection. Therefore, it becomes possible to increase the ignition retarding amount without significantly degrading combustion stability, in other words, to perform a larger torque down by the ignition retard.

That is, since the air-fuel ratio (A/F) is set as a stoichiometric air-fuel ratio (14.7:1) or a leaner in the first and second operating ranges, if only the ignition timing is retarded while the injection amount and the injection timing of fuel are maintained, combustion stability will degrade significantly (a misfire, etc. occurs) when the retarding amount reaches a certain value, and thereby, it becomes difficult to retard the ignition timing further. However, as described above, if the portion of fuel to be injected in one cycle is injected during the compression stroke, the homogenization of fuel by the intake-stroke injection at the early period side is maintained, and the air-fuel ratio around the ignition plug at the retarded ignition timing becomes in a rich state, thereby preventing the degradation of ignitability and combustibility. That is, the significant degradation in combustion stability is avoided. Therefore, it becomes possible to further increase the ignition retarding amount, while maintaining combustion stability.

In addition, according to the engine of this embodiment, there is also an advantage of contributing to secure emission performance. Below, this advantage is described.

Figure 10:
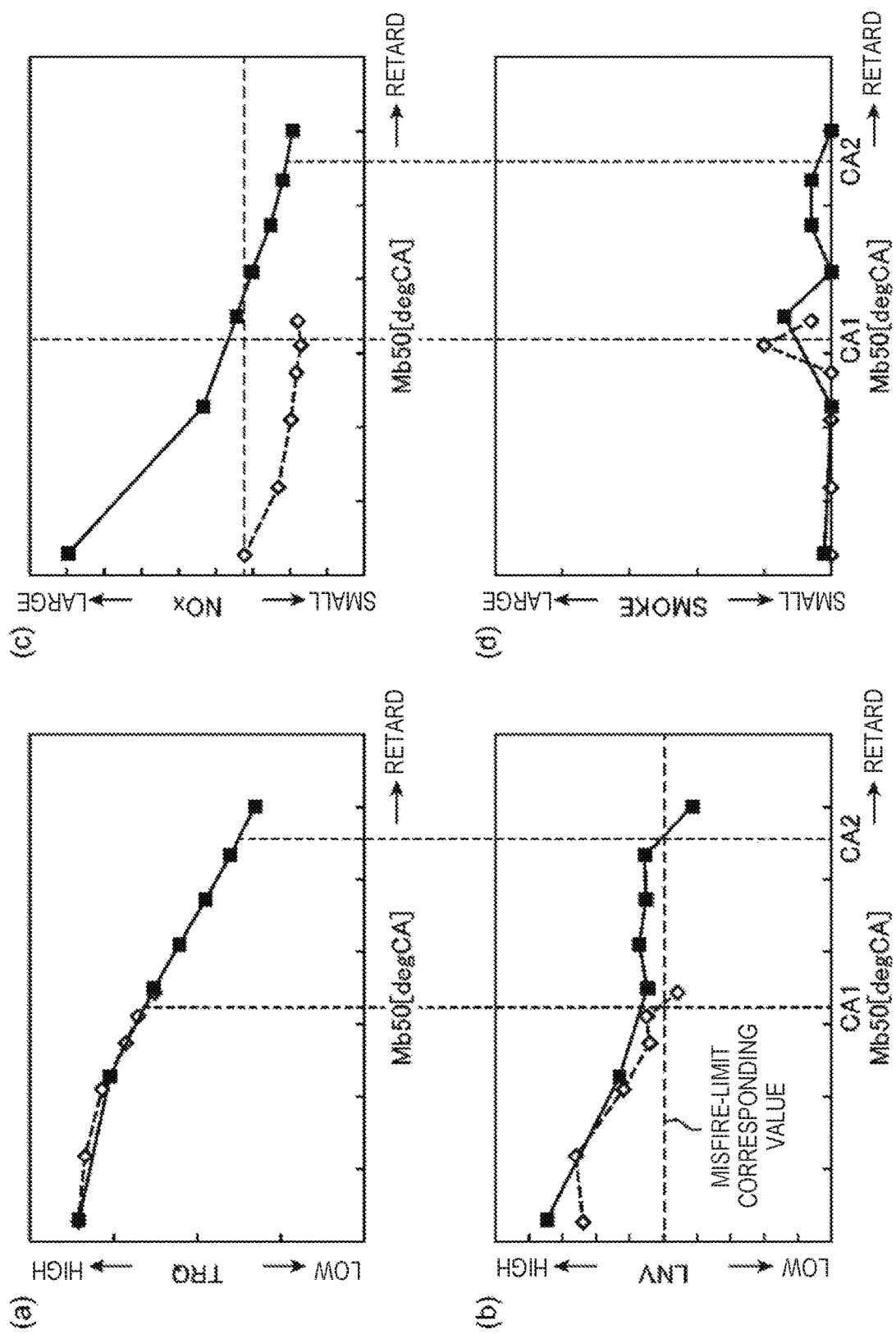
FIG. 10 illustrates graphs of relationships of Mb50 (ignition timing) vs. (a) the output torque, (b) the LNV, (c) an amount of NOR, and (d) an amount of smoke, respectively.

Charts (a) to (d) of FIG. 10 illustrate a relation between a fuel center-of-gravity position (Mb50), and the torque, the LNV, a $NO_x$ generating amount, and a smoke generating amount in the first operating range A1, respectively. A broken line graph in each of Charts (a) to (d) illustrates the relation when only the ignition timing is retarded from the basic ignition timing while maintaining the basic injection timing (hereinafter, referred to as the "intake injection control"), and a solid line graph illustrates the relation when the ignition timing is retarded from the basic ignition timing, and the injection timing of the third, final injection among the first to third injections is changed from the intake-stroke injection to the compression-stroke injection (hereinafter, referred to as the "compression injection control"). Note that the fuel center-of-gravity position (Mb50) is a crank angle position when 50% of the fuel injected in one cycle combusts, and in this figure, the fuel center-of-gravity position is illustrated with reference to TDC (compression top dead center) by the crank angle. That is, Charts (a) to (d) illustrate that the ignition retarding amount is larger as they go to the right side from the basic ignition timing.

In either the intake injection control or the compression injection control, the output torque decreases as the ignition retarding amount increases as illustrated in Chart (a). As illustrated in Chart (b), the LNV reaches the misfire-limit corresponding value at an ignition retarding amount of Mb50=CA1 in the intake injection control, and, on the other hand, in the compression injection control, combustion stability is maintained up to an ignition retarding amount of Mb50=CA2 which is at the advancing side thereof (>CA1). This is because, as described above, in the compression injection control, the air-fuel ratio around the ignition plug at the retarded ignition timing becomes in the rich state, while the homogenization of the fuel is maintained by the intake-stroke injection at the early period side, thereby preventing the degradation of the ignitability and the combustibility.

On the other hand, focusing on the $NO_x$ and smoke generating amounts, as illustrated in Chart (c), although the $NO_x$ generating amount is reduced as the ignition retarding amount increases, if the ignition retarding amount is equivalent thereto (Mb50 is equivalent), the $NO_x$ generating in the compression injection control is much more than the $NO_x$ generating amount in the intake injection control. This is because, in the compression injection control, the in-cylinder temperature after the ignition becomes higher than that in the intake injection control by making the air-fuel ratio around the ignition plug 16 is into the rich state at the ignition timing. Note that both in the intake injection control and the compression injection control, the smoke generating amount is suppressed to a comparatively low level as illustrated in Chart (d), regardless of the ignition retarding amount.

Here, according to the above control of the flowchart (FIG. 6), as described above, the basic injection control is performed before the LNV reaches the misfire-limit corresponding value (the range where Mb50 is less than CA1 in Chart (b) of FIG. 10), the compression injection control is performed when such an ignition retarding amount that Mb50 becomes equal to or more than CA1 is required (i.e., when a larger torque down is required) (Steps S13 to S17). That is, the generation of $NO_x$ is suppressed by switching the control between the basic injection control and the compression injection control bordering on the ignition retarding amount of Mb50=CA1. For example, although only the compression injection control is performed if the ignition retarding amount is to be increased, the $NO_x$ generating amount will be comparatively large in this case in the range where the amount of torque-down request is comparatively small (the range of the ignition retarding amount where Mb50 becomes less than CA1). However, as illustrated in Chart (c), the maximum value of the $NO_x$ generating amount in the range of the ignition retarding amount where Mb50 becomes equal to or more than CA1 is substantially equal to the maximum value of the $NO_x$ generating amount in the range of the ignition retarding amount where Mb50 becomes less than CAL and therefore, according to the above control in which the basic injection control and the compression injection control may be switchable bordering on the ignition retarding amount of Mb50=CA1, the $NO_x$ generating amount can be suppressed to a low level which is equivalent to the $NO_x$ generating amount in the basic injection control, regardless of the ignition retarding amount. Therefore, according to the above control of the flowchart (FIG. 6), it contributes to the securing of the emission performance, while increasing the ignition retarding amount.

6. Modifications

Figure 11:
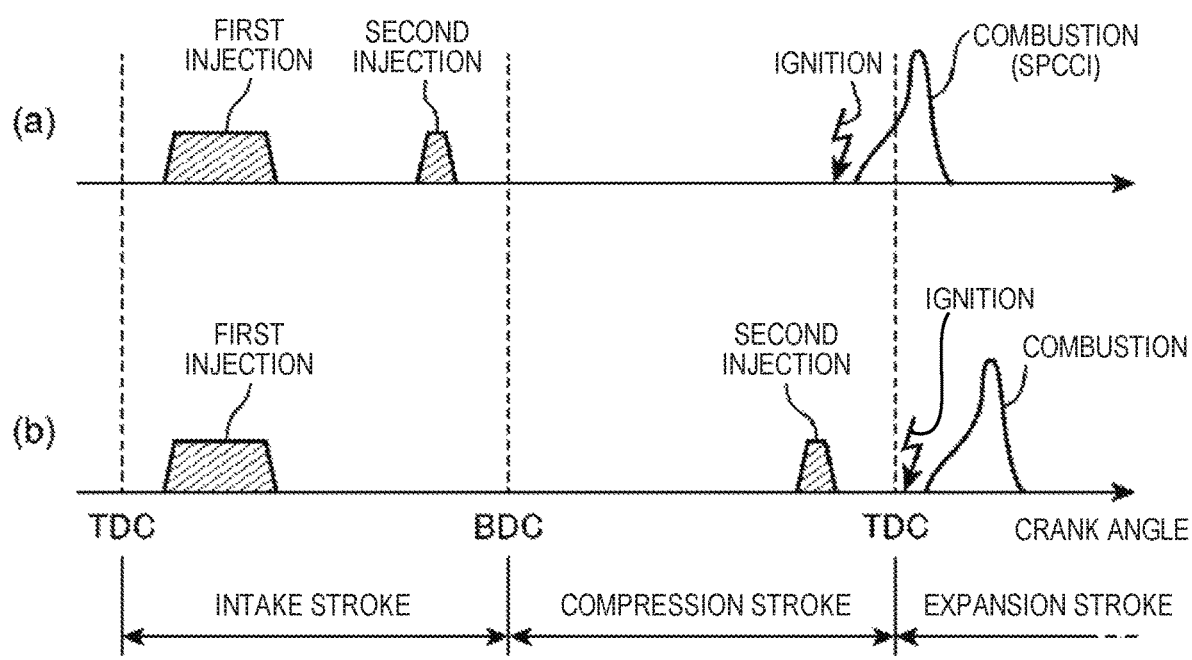
FIG. 11 is a time chart schematically illustrating another example of the combustion control performed in the second operating range.

The basic injection amount and the basic injection timing in the first and second operating ranges A1 and A2 illustrated in Charts (a) and (b) of FIG. 5, and the injection amount and the injection timing in the first and second operating ranges A1 and A2 during the ignition retard illustrated in Charts (a) and (b) of FIG. 7 are merely illustration of the preferable embodiment, and the injection amount and the injection timing other than FIGS. 5 and 7 may also be adopted. Especially, for the injection amount and the injection timing of fuel when the torque-down request is confirmed and it is determined that combustion stability cannot be maintained only by the ignition retard, various controls may be employed as long as it is a control for injecting in a compression stroke a part of fuel to be injected in one cycle, while maintaining the intake-stroke injection. For example, the basic injection amount and the basic injection timing in the second operating range A2 may be set so that fuel to be injected in one cycle is injected in two steps (a first injection and a second injection) during an intake stroke as illustrated in Chart (a) of FIG. 11, and, in this case, the injection timing may be changed so that the second injection is performed during a compression stroke as illustrated in Chart (b) of FIG. 11.

In the above embodiment, in the first and second operating ranges A1 and A2, when the torque-down request is confirmed and it is determined that combustion stability cannot be maintained only by the ignition retard, the control for injecting in the compression stroke the portion of fuel to be injected in one cycle is performed. However, when the torque-down request is confirmed, a control for injecting in the compression stroke the portion of fuel to be injected in one cycle may always be performed. That is, even if the significant degradation in combustion stability due to the ignition retard is not expected, the portion of fuel to be injected in one cycle may be injected in the compression stroke. However, in this case, as described above, since the $NO_x$ generating amount may become comparatively large depending on the ignition retarding amount, it is desirable to perform the above control together with a control for stimulating an activation of the three-way catalyst 41a.

In the embodiment, although the case where there is a torque-down request is the upshift request for upshifting the gear stage of the automatic transmission 60 or during cornering of the vehicle, it is possible to perform the control like the above embodiment also when there is a torque-down request for other reasons. Moreover, it is also possible to perform a control similar to the control of the above embodiment, as the control for retarding the ignition timing for the reasons other than the torque-down request.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Body
15 Injector
16 Ignition Plug
100 PCM
101 Calculating Module (Ignition Retard Determining Module, Combustibility Estimating Module)
102 Combustion Controlling Module

What is claimed is:

1. A control device for an engine including a combustion chamber, an ignition plug disposed in the combustion chamber, and an injector configured to inject fuel into the combustion chamber, the control device comprising:
a processor configured to execute:
a combustion controlling module to control the ignition plug and the injector so that partial compression ignition combustion in which spark ignition (SI) combustion of a portion of a mixture gas inside the combustion chamber is carried out by flame propagation from an ignited point of the ignition plug, and compression ignition (CI) combustion of the remaining mixture gas is carried out by self-ignition is performed; and an ignition retard determining module to determine whether there is a request for an ignition retard for retarding an ignition timing of the ignition plug, wherein when controlling the ignition plug and the injector so that the partial compression ignition combustion is performed, when there is not the request for the ignition retard, the combustion controlling module executes a control in which the entire fuel to be injected in one cycle is injected in an intake stroke and jump-spark ignition is carried out at a basic ignition timing set according to an operating condition of the engine, and on the other hand, when there is the request for the ignition retard, the combustion controlling module executes a control in which an injection is performed in an intake stroke, a portion of the entire fuel is injected in a compression stroke, and the ignition timing is retarded from the basic ignition timing.

2. The control device of claim 1, wherein the processor is further configured to execute a combustibility estimating module to estimate combustion stability when the ignition timing is retarded, and wherein the combustion controlling module executes the control in which the portion of the entire fuel is injected in the compression stroke, when there is the request for the ignition retard, and when combustion stability is estimated to be lowered below a given level when the ignition timing is retarded by a requested retarding amount.

3. The control device of claim 1, wherein the ignition retard determining module determines that there is the request for the ignition retard based on the existence of a torque-down request for temporarily reducing an output torque of the engine.

4. The control device of claim 1, wherein when there is not the request for the ignition retard, the combustion controlling module causes the injector to inject the entire fuel to be injected in one cycle over a plurality of injections in an intake stroke, and when there is the request for the ignition retard, a timing of a final injection among the plurality of injections is changed from the intake stroke to a compression stroke.

5. The control device of claim 1, wherein when there is the request for the ignition retard during a combustion control in which at least a target air-fuel ratio becomes higher than a stoichiometric air-fuel ratio, the combustion controlling module executes the control in which the portion of the entire fuel is injected in the compression stroke, while performing the injection in the intake stroke, and the ignition timing is retarded from the basic ignition timing.

6. The control device of claim 3, wherein the ignition retard determining module determines that there is the request for the ignition retard, when a request for an upshift for upshifting a gear stage of a transmission coupled to the engine is received.

7. The control device of claim 3, wherein the ignition retard determining module determines that there is the request for the ignition retard, when a request for temporarily reducing a driving torque of wheels of a vehicle in order to secure drivability is received.

8. A method of controlling an engine, comprising the steps of:

controlling an ignition plug disposed in a combustion chamber and an injector configured to inject fuel into the combustion chamber so that partial compression ignition combustion in which spark ignition (SI) combustion of a portion of a mixture gas inside the combustion chamber is carried out by flame propagation from an ignited point of the ignition plug, and compression ignition (CI) combustion of the remaining mixture gas is carried out by self-ignition is performed;

determining whether there is a request for an ignition retard for retarding an ignition timing of the ignition plug; and when controlling the ignition plug and the injector so that the partial compression ignition combustion is performed and there is not the request for the ignition retard, executing a control in which the entire fuel to be injected in one cycle is injected in an intake stroke and jump-spark ignition is carried out at a basic ignition timing set according to an operating condition of the engine, and when there is the request for the ignition retard, executing a control in which an injection is performed in an intake stroke, a portion of the entire fuel is injected in a compression stroke, and the ignition timing is retarded from the basic ignition timing.

* * * * *